(12) United States Patent
Yoshikawa

(10) Patent No.: US 7,626,997 B2
(45) Date of Patent: Dec. 1, 2009

(54) METHODS AND SYSTEMS FOR ESTIMATING ACCESS/UTILIZATION ATTEMPT RATES FOR RESOURCES OF CONTENTION ACROSS SINGLE OR MULTIPLE CLASSES OF DEVICES

(75) Inventor: Cary Y. Yoshikawa, Aurora, IL (US)

(73) Assignee: Alcatel-Lucent USA Inc., Murray Hill, NJ (US)

(*) Notice: Subject to any disclaimer, the term of this patent is extended or adjusted under 35 U.S.C. 154(b) by 942 days.

(21) Appl. No.: 11/257,337

(22) Filed: Oct. 24, 2005

(65) Prior Publication Data

US 2007/0091807 A1    Apr. 26, 2007

(51) Int. Cl.
*H04L 12/413* (2006.01)

(52) U.S. Cl. ............... 370/447; 370/337; 370/321; 370/328; 370/338

(58) Field of Classification Search ............ 370/447, 370/337, 321, 328, 338
See application file for complete search history.

(56) References Cited

U.S. PATENT DOCUMENTS

| 6,535,736 B1 | 3/2003 | Balogh et al. |
| 6,748,220 B1* | 6/2004 | Chow et al. ............ 455/450 |
| 2002/0118661 A1 | 8/2002 | Voce |

* cited by examiner

*Primary Examiner*—Nghi H Ly
(74) *Attorney, Agent, or Firm*—Fay Sharpe, LLP

(57) ABSTRACT

Systems and methods are described for estimating attempt rates for access/utilization of a resource(s) by a plurality of devices, in which rate analysis window timeslot data and a simulated attempt rate model are used to estimate the current attempt rate for the resource(s).

25 Claims, 8 Drawing Sheets

METHODS AND SYSTEMS FOR ESTIMATING ACCESS/UTILIZATION ATTEMPT RATES FOR RESOURCES OF CONTENTION ACROSS SINGLE OR MULTIPLE CLASSES OF DEVICES

FIELD OF THE INVENTION

The invention relates to communications networks in general, and more particularly to methods and systems for estimating the rate of access/utilization attempts for resources of contention.

BACKGROUND OF THE INVENTION

In communications systems, such as wireless, wireline, LAN, WAN, WIMAX, Blue Tooth wireless mobile communications systems, etc., various resources or pools of resources are shared among multiple devices that require access to or continued utilization of the shared resources. Examples of such shared resources include communications network elements, base stations, networks, servers, communications media, etc. Resource contention can occur when multiple devices attempt to simultaneously access a resource such that the input handling capacity of the resource is exceeded (access attempt collision failure), or when the resource is operating at maximum capacity and is unable to service any additional information from one or more devices (utilization attempt failure). For instance, to initiate a call in an Evolution Data Only (EVDO) Rev. A wireless network, mobile communications devices, such as cell phones, PDAs, portable computers, etc., compete for access to a local base station serving a given area or location to communicate with the base station over an access channel. In this case, the base station periodically sends a broadcast message to all devices in the area, which identifies the access channel to be used for setting up a call. Contention arises when two or more mobile units simultaneously attempt to access the base station on the access channel, leading to a collision of the call initiation messages. Resource utilization contention occurs when contention for a shared resource with limited utilization or loading capabilities causes some attempts for utilization to fail (e.g., dropped data packets). In many of these systems, moreover, access to the resource is provided in prioritized fashion according to the class of the devices attempting usage of the resource. For instance, EVDO Rev. A and other communications systems support two or more levels or classes of device priority, with devices of a higher priority class receiving preferential utilization or access relative to lower priority devices.

In systems having shared resources, it is often desirable to ascertain the amount of access/utilization attempts (incoming throughput seen by the resource) in a given time period, for data monitoring and/or system control purposes. In this regard, many shared resource systems allow devices to retry failed access attempts in a controlled manner (sometimes referred to as apersistence) according to a system controlled parameter, in order to optimize resource access/utilization throughput and/or to minimize access latency. For example, the devices that experience a failure in attempting access/utilization may perform an apersistence test using apersistence property information received from the resource of contention. In the case of EVDO systems, the communications devices are synchronized with a base station resource to selectively attempt access/utilization at discrete times, where the devices internally perform an apersistence test using an apersistence property value broadcast by the base station. The devices derive an apersistence number from the apersistence property value received from the base station, and compare the apersistence number to a randomly generated value in each access cycle, and the decision on whether to attempt access/utilization by the device is therefore based on information received from the resource. In order to control the access attempts, the base station resource adjusts the value of the apersistence property in closed loop fashion to reduce the likelihood of a given device passing the apersistence test when the current resource load is high and vice versa. However, the accuracy of the closed loop adjustments to the apersistence property value is limited by the extent to which the actual current resource load is observable. Furthermore, the ability to compile statistics of access/utilization attempts with respect to a given shared resource is likewise dependent upon the accuracy of the resource loading measurements. In addition, it may be desirable to ascertain the rate of access/utilization attempts associated with a given class of requesting devices in a multiple class system. Consequently, there is a need for techniques and apparatus for estimating the rate of access/utilization attempts for resources of contention.

SUMMARY OF THE INVENTION

The following is a summary of one or more aspects of the invention to facilitate a basic understanding thereof, wherein this summary is not an extensive overview of the invention, and is intended neither to identify certain elements of the invention, nor to delineate the scope of the invention. Rather, the primary purpose of the summary is to present some concepts of the invention in a simplified form prior to the more detailed description that is presented hereinafter. The invention relates to systems and methods for estimating attempt rates for access/utilization of a shared resource by a plurality of devices, in which rate analysis window timeslot data and a simulated attempt rate model are used to estimate the current attempt rate for the resource, wherein the terms access and utilization are used synonymously hereinafter.

In accordance with one or more aspects of the invention, a method is provided for estimating a rate of attempted utilization of a resource or pool of resources by a plurality of devices. The method involves obtaining current rate analysis window timeslot data and estimating a current attempt rate based on the timeslot data and a simulated attempt rate model. The timeslot data is obtained for a current time window corresponding to a plurality of successive timeslots forming a current rate analysis window, where the data indicates the number of timeslots in the in which no attempts occurred (empty timeslots), the number of timeslots in which a successful attempt occurred (successful timeslots), and the number of timeslots in which a collision occurred (collision timeslots). The method may also include updating the rate analysis window with data from one or more new timeslots, as well as estimating a new current attempt rate based on the simulated attempt rate model and the updated rate analysis window timeslot data.

The simulated attempt model can be one or more data tables, formulas, algorithms, or other model form that maps simulations of attempt rates to observed data in an integer number of successive timeslots forming a rate analysis window, with the estimation involving finding a best fit for the observed data in the model to select the corresponding rate estimate. In one implementation, the attempt rate model is comprised of a data table with entries individually corresponding to a simulated attempt rate, including simulated values indicating the number of empty, successful, and collision timeslots for the corresponding attempt rate. In this case, a simulation table entry is selected for which the current rate analysis window timeslot data most closely corresponds to the simulated empty, successful, and collision values, and the attempt rate is estimated based on the attempt rate value corresponding to the selected table entry. More than one data table may be used, for instance, simultaneously using a short table corresponding to a short window length (faster detection of larger changes in access rates) and a longer table for a longer window length (sensitive to smaller changes in access rates, but requires more time), wherein first and second attempt rate estimates may be generated. The method may be employed in conjunction with multiple class systems in which devices of a plurality of different priority classes are able to utilize the resource, where the timeslot data may also indicate the numbers of timeslots having successful attempts for each of the priority classes. In such implementations, the current attempt rate estimation may also include determining an estimated relative class attempt rate for each class based on the simulated attempt rate model and the current rate analysis window timeslot data. Furthermore, the relative class attempt rates for each class may be scaled according to a current average throughput scaling factor, for instance, as used in controlling apersistence in the system.

Other aspects of the invention relate to an access/utilization attempt rate determination system for estimating a rate of attempted utilization of a resource or pool of resources by a plurality of devices. The system includes a simulated attempt rate model that maps simulations of attempt rates to observed data in a plurality of successive timeslots forming a rate analysis window, as well as rate estimation logic which obtains timeslot data corresponding to a current rate analysis window and estimates a current attempt rate based on the simulated attempt rate model and the timeslot data. The estimation logic and simulation model can be any suitable types of hardware, software, or combinations thereof. In one example, the model comprises one or more data tables with entries individually corresponding to an attempt rate, with each table entry including simulated values indicating the number of empty, successful, and collision timeslots for the corresponding attempt rate in a corresponding simulated rate analysis window, where two or more different tables may be based on different window sizes, and can be concurrently employed to provide multiple rate estimates. The logic in this implementation estimates the current attempt rate based on the rate value corresponding to the table entry for which the current rate analysis window timeslot data most closely corresponds to the simulated values. The system may be used in situations where devices of different priority classes are competing for the resource, where the rate estimation logic determines an estimated relative class attempt rate for each class, and may also scale the rate estimates according to a current average throughput scaling factor.

BRIEF DESCRIPTION OF THE DRAWINGS

The following description and drawings set forth in detail certain illustrative implementations of the invention, which are indicative of several exemplary ways in which the principles of the invention may be carried out. Various objects, advantages, and novel features of the invention will become apparent from the following detailed description of the invention when considered in conjunction with the drawings, in which.

DETAILED DESCRIPTION OF THE INVENTION

Figure 1:
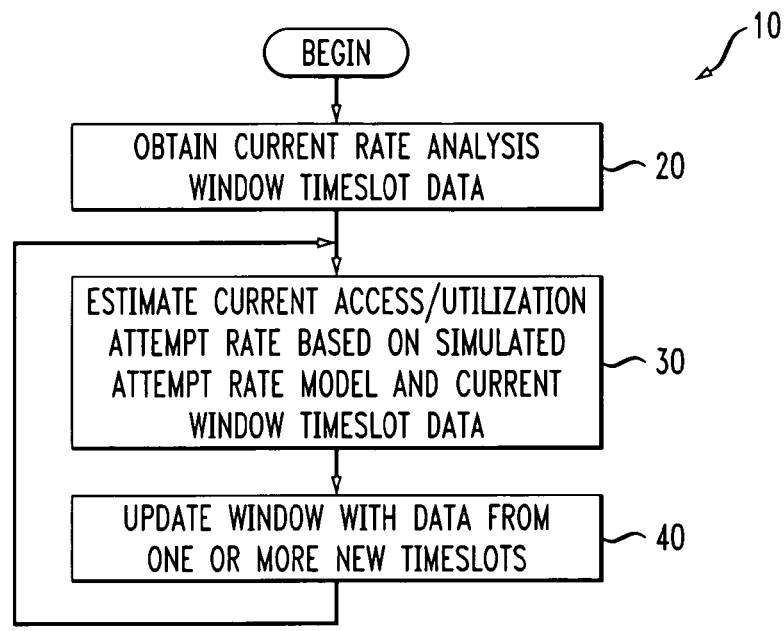
FIG. 1 is a flow diagram illustrating an exemplary method for estimating a rate of attempted access or utilization of a resource or pool of resources by a plurality of devices in accordance with one or more aspects of the present invention.

Referring initially to FIGS. 1-4B, an exemplary method 10 is illustrated in FIG. 1 for estimating or determining a rate of attempted access/utilization of a resource or pool of resources by a plurality of devices using one or more simulated rate models in accordance with one or more aspects of the present invention. While the method 10 and other methods of the invention are illustrated and described below in the form of a series of acts or events, it will be appreciated that the various methods of the invention are not limited by the illustrated ordering of such acts or events. In this regard, except as specifically provided hereinafter, some acts or events may occur in different order and/or concurrently with other acts or events apart from those illustrated and described herein in accordance with the invention. It is further noted that not all illustrated steps may be required to implement a process or method in accordance with the present invention. The illustrated methods and other methods of the invention may be implemented in hardware, software, or combinations thereof, in order to provide an estimated attempt rate for a shared resource (or multiple class estimates in a prioritized system with devices of different priority classes attempting to access or otherwise utilize a resource or pool of resources). In one example illustrated and described below, the methods are practiced in hardware and/or software of a base station or network server in a mobile wireless communications system to estimate the access/utilization attempt loading for a base station resource providing prioritized communications services to a plurality of mobile communications devices or units. However, the invention is not limited to the specific applications illustrated and described herein. In addition, the methods of the invention can be used in a variety of applications, including but not limited to data acquisition tasks in which a measure of system utilization is desired, and control situations wherein the estimated value is used as system feedback to control one or more facets of the system operation, such as apersistence parameters, etc.

Figure 4A:
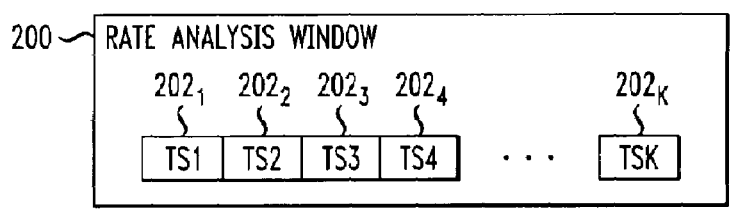
FIGS. 4A and 4B are schematic diagrams illustrating an exemplary rate analysis interval or window including a number of timeslots for which data is obtained to indicate the number of empty, successful, and collision timeslots.
Figure 4B:
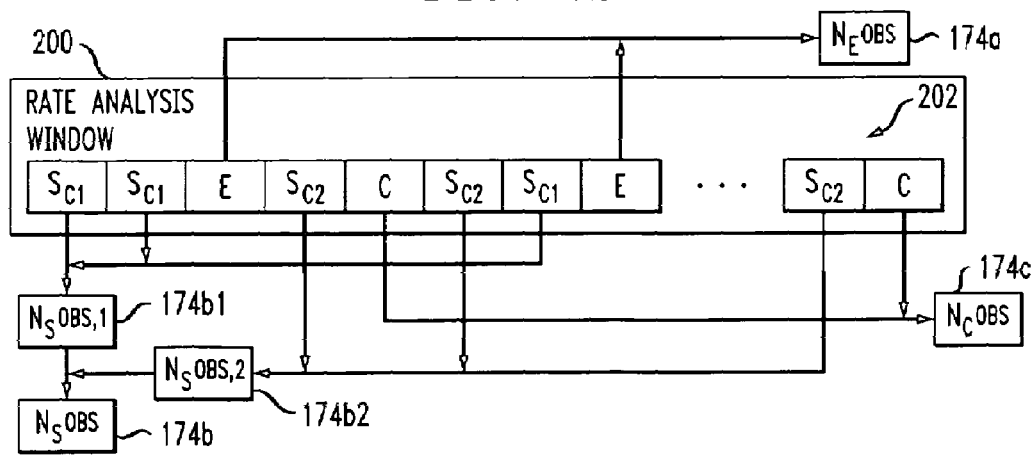

As shown in FIG. 1, the method 10 includes obtaining current rate analysis window timeslot data at 20, which corresponds to a plurality of timeslots forming a current rate analysis window. FIGS. 4A and 4B illustrate one such rate analysis window 200 having an integer number K timeslots $202_1$-$202_K$, where K is a positive integer greater than 1 for which timeslot data is obtained to indicate the number of empty, successful, and collision timeslots 202 in the window 200. As shown best in FIG. 4B, each timeslot 202 has one of three observable conditions, including empty (E), successful (S), and collision (C), wherein the success data (e.g., $S_{C1}$, $S_{C2}$) may also indicate the priority class of the device that successfully accessed or utilized the resource in a particular timeslot 202. In the illustrated example, the timeslot data 174 for a current rate analysis window 200 includes the number of observed empty timeslots $N_E^{OBS}$ 174a in which no attempts occurred, the observed number of timeslots $N_S^{OBS}$ 174b in which a successful attempt occurred, and the observed number of timeslots $N_C^{OBS}$ 174c in which a collision occurred. In other possible implementations, the resource or other component that measures or otherwise generates the timeslot data 174 may provide only the number $N_S^{OBS}$ 174b of successful timeslots and one of the values 174a and 174c, from which the other can be determined knowing the number K timeslots 202 in each window 200. With this information obtained at 20, the method 10 in FIG. 1 proceeds to 30, where the current access/utilization attempt rate is estimated based on a simulated attempt rate model and the current rate analysis window timeslot data 174. The window is then updated at 40 with data from one or more new timeslots, whereafter another estimate is generated at 30, and the method 10 may thereafter continue to provide a series of estimated attempt rate values to be used for data acquisition and/or control purposes.

Figure 2:
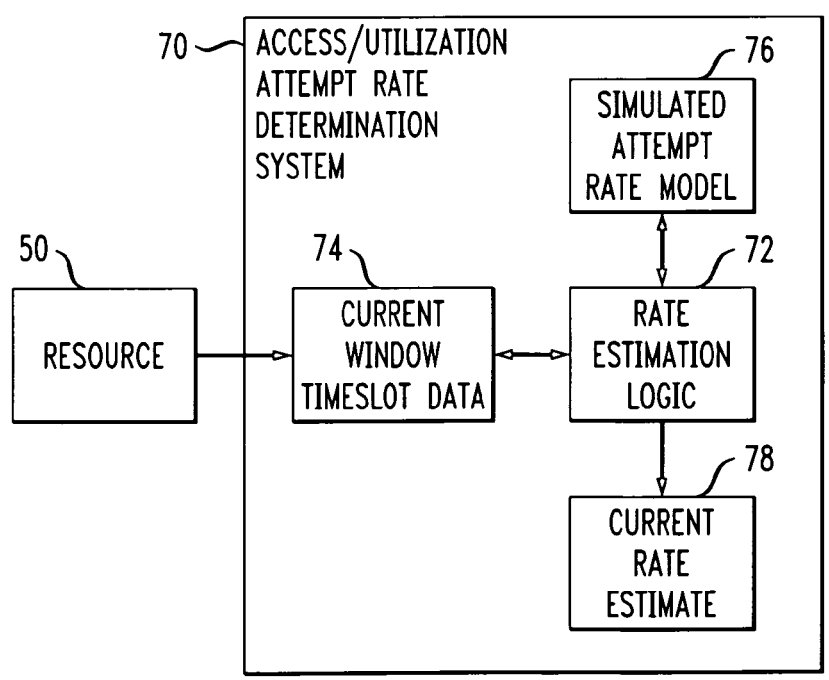
FIG. 2 is a simplified schematic diagram illustrating an exemplary access/utilization attempt rate determination system in accordance with various aspects of the invention.

FIG. 2 shows an exemplary system 70 in accordance with the invention, which operates to provide one or more current rate estimates 78 of attempts to access or utilize a resource 50, where the system 70 can be integrated into the resource 50 or may be provided in a separate component, such as a network server operatively associated with the resource 50 or with a measurement component that provides current rate analysis window data to the system 70. The system 70 and other access/utilization attempt rate determination systems of the invention (e.g., system 170 illustrated and described below) can be implemented in hardware, software, or combinations thereof, wherein all such implementations are contemplated as falling within the scope of the invention and the appended claims. Moreover, the rate determination system 70 may provide the estimate 78 to any device or component in a given system, regardless of the nature of the usage of the estimate 78, such as to an apersistence control system associated with a base station (e.g., control system 160 and base station resource 150 in FIG. 3).

As shown in FIG. 2, the access/utilization attempt rate determination system (AARDS) 70 is comprised of rate estimation logic 72 and a simulated rate model 76, where the logic 72 obtains current rate analysis window timeslot data 74 corresponding to a current rate analysis window, such as the data 174 for window 200 in FIG. 4B. The data 74 may be obtained from the resource 50 itself or from another system component that operates to compile or otherwise provide current window timeslot data 74 indicating the number of successful timeslots 202, empty timeslots 202, and collision timeslots 202 observed for the resource 50 in the current window 200. The estimation logic 72 can be any hardware or software or combinations thereof which operate to estimate a current attempt rate 78 based on the current rate analysis window timeslot data 74 and the simulated attempt rate model 76. The model 76 can be any form of software, hardware, etc., such as one or more equations, formulas, algorithms, curves, data files, etc., such as a data table structure as described in greater detail below, by which the logic 72 obtains an estimate 78 of an actual attempt rate-corresponding to the current window data 74. In this regard, model 76 maps simulations of attempt rates to observed data in an integer number of K successive timeslots 202 forming a rate analysis window 200, where the number K of timeslots 202 in a given window 200 (e.g., the window length) used in creating the simulation model 76 is preferably the same as the number of timeslots 202 used in obtaining the data 74.

Figure 3:
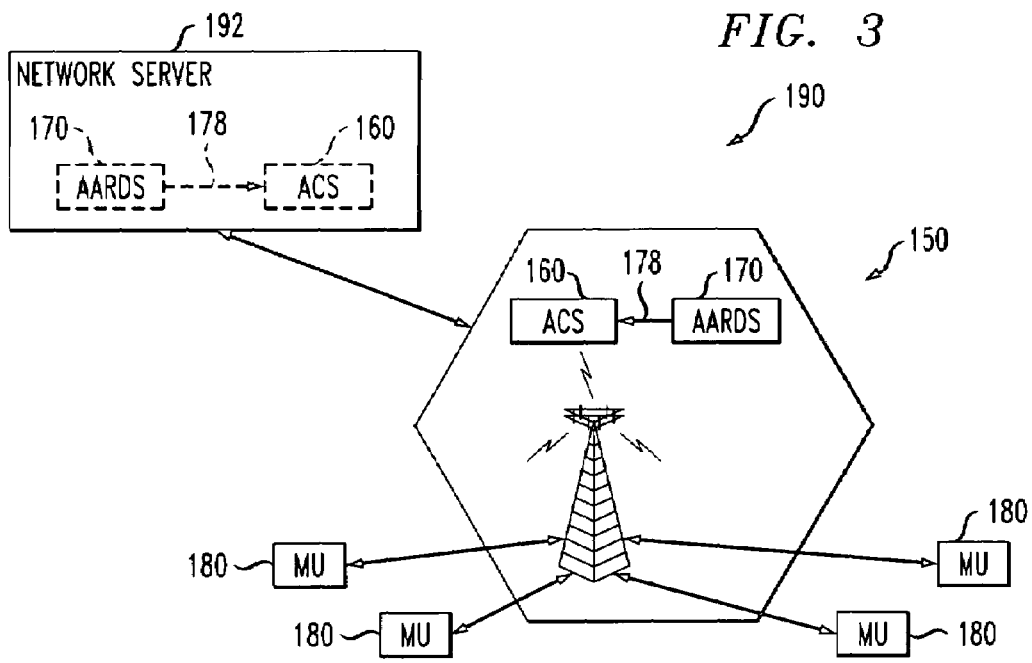
FIG. 3 is a simplified schematic diagram illustrating a mobile communications system with a base station resource providing communications services for a number of mobile communications units, with an access/utilization attempt rate determination system operatively associated with the base station in accordance with the present invention, where the rate determination system provides a rate estimate to an apersistence control system associated with the base station.

FIG. 3 illustrates a mobile communications system 190 with a base station resource 150 providing communications services for a number of mobile communications units or devices 180 (MU), where the system 190 includes an access/utilization attempt rate determination system (AARDS) 170 including a simulation model and estimation logic as described in association with the system 70 of FIG. 2 above. In addition, the communications system 190 includes an apersistence control system 160 (ACS) operatively associated with the base station 150 that uses an attempt rate estimate 178 from the AARDS 170 to control apersistence of devices 180 in attempting to access/utilize base station 150. In one exemplary embodiment, the AARDS 170 and the ACS 160 are integrated into the base station 150. Another embodiment provides the ACS 160 and AARDS 170 in a network server 192 of communications system 190, as shown in dashed lines in FIG. 3. As discussed above, moreover, AARDS 170 may be implemented in other system components (not shown) within the scope of the present invention and the appended claims, wherein the illustrated embodiments are merely examples. In operation, the AARDS 170 obtains current rate analysis window timeslot data and estimates a current attempt rate for the base station 150 based on a simulated attempt rate model and the window timeslot data.

Figure 5:
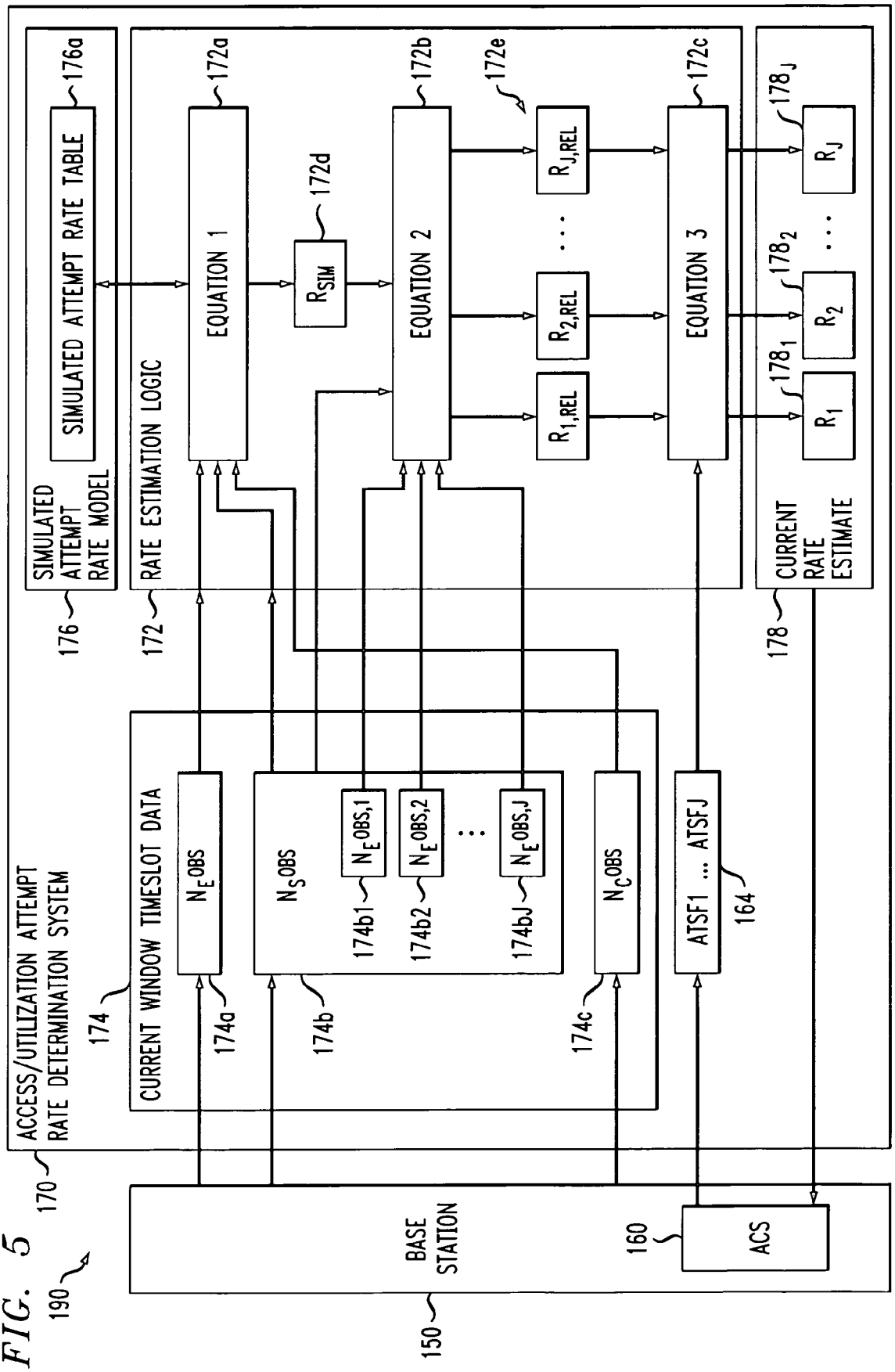
FIG. 5 is a detailed schematic diagram illustrating an exemplary access/utilization attempt rate determination system associated with a base station resource for estimating one or more attempt rates for the base station in accordance with the invention.
Figure 6:
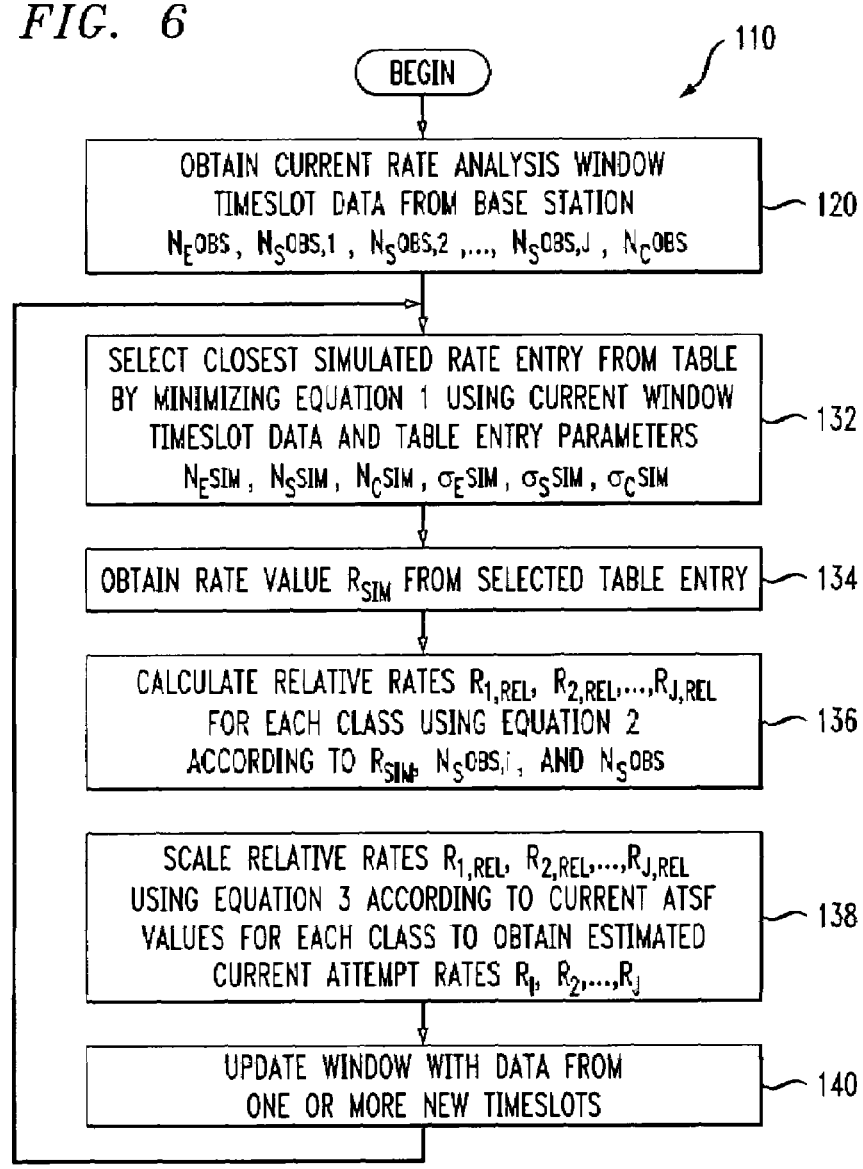
FIG. 6 is a detailed flow diagram illustrating an exemplary method for estimating access/utilization attempt rates for a multiple class communications system base station resource in accordance with the invention.
Figure 7:
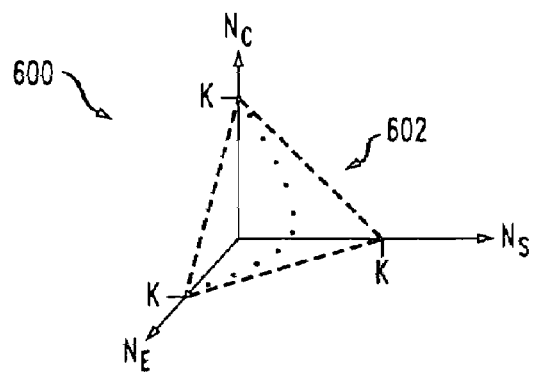
FIG. 7 is a three dimensional plot illustrating the relationship between the number of empty, successful, and collision timeslots in a given rate analysis window.

Referring also to FIGS. 5-7, further details of the exemplary access/utilization rate determination system 170 are shown in FIG. 5, wherein FIG. 6 illustrates a rate estimation method 110 that may be implemented in the system 170 in accordance with various aspects of the invention. As shown in FIG. 5, the exemplary AARDS 170 comprises rate estimation logic 172, and a simulated attempt rate model 176, which are equivalent to the above described logic 72 and model 76 of FIG. 2. Also similar to the system 70 of FIG. 2, the logic 172 in AARDS 170 of FIG. 5 obtains current window timeslot data 174 from base station 150 (or from another system components, not shown), and uses the data 174 and model 176 to derive a current rate estimate 178, in this case, an integer number J rate estimates $178_1$-$178_J$ corresponding to different priority classes for devices 180 serviced by the system 190. The model 176 comprises data in the form of graphs, curves, equations, formulas, tables, etc., with the data being simulated according to the resource and system of interest, such as an EVDO Rev. A communications system 190 and the base station resource 150 of FIG. 3 in the illustrated examples. Moreover, the model 176 is preferably simulated according to a selected integer number K representing the number of timeslots 202 within the windows 200 being used. In this regard, the model 176 may include multiple tables, formulas, etc., corresponding to different window lengths K, with the system 170 being operable to change the window size. The following TABLE 1 illustrates an exemplary simulated attempt rate table 176a of model 176 in FIG. 5:

K timeslots, where K=256 timeslots corresponding to roughly 27.31 seconds in this embodiment. The data of TABLE 1 was simulated for a base station resource 150 rated at 6500 BHCA in an EVDO wireless system 190 with no apersistence (open loop). In this modeling, moreover, the number of devices simulated was 7,000 mobile units 180 randomly attempting to access or utilize the base station 150 where the simulated accessing devices 180 would undergo random retries. The data table entries further include simulated standard deviation values $\sigma_E^{SIM}$, $\sigma_S^{SIM}$, $\sigma_C^{SIM}$ indicating simulated standard deviations for the number of empty, successful, and collision timeslots, respectively. Although the illustrated data table 176a provides entries with an attempt rate granularity or step size of 650 BHCA, any suitable step size may be used.

In operation, the logic 172 in the AARDS 170 estimates the current attempt rate 178 based on the attempt rate value $R_{SIM}$ corresponding to the table entry for which the current rate analysis window timeslot data 174 most closely corresponds to the simulated values $N_E^{SIM}$, $N_S^{SIM}$, and $N_C^{SIM}$. In this manner, the current attempt rate estimate 178 is based on the simulated attempt rate model 176 and the current rate analysis window timeslot data 174, by which the mapping of the model 176 provides useful rate information that may not be ascertainable from the observed data 174 alone, particularly where the current rate of incoming attempts to access/utilize

TABLE 1

| $R_{SIM}$ (BHCA) | $N_E^{SIM}$ | $\sigma_E^{SIM}$ | $N_S^{SIM}$ | $\sigma_S^{SIM}$ | $N_C^{SIM}$ | $\sigma_C^{SIM}$ |
|---|---|---|---|---|---|---|
| 650 | 250.725191 | 2.850080 | 4.809160 | 2.318576 | 0.465649 | 0.943420 |
| 1300 | 246.587786 | 3.623229 | 8.435115 | 2.887454 | 0.977099 | 1.238478 |
| 1950 | 240.114504 | 5.221274 | 14.030534 | 3.852111 | 1.854962 | 2.015672 |
| 2600 | 233.580153 | 7.290016 | 19.488550 | 4.885508 | 2.931298 | 3.446850 |
| 3250 | 228.175573 | 7.057540 | 23.923664 | 4.697926 | 3.900763 | 3.708573 |
| 3900 | 220.938931 | 8.640183 | 30.106870 | 5.632853 | 4.954198 | 4.378753 |
| 4550 | 217.053435 | 9.143732 | 33.221374 | 5.766831 | 5.725191 | 4.417269 |
| 5200 | 209.236641 | 10.975915 | 39.160305 | 6.211067 | 7.603053 | 6.354273 |
| 5850 | 199.366412 | 12.593592 | 44.412214 | 6.529873 | 12.221374 | 8.161808 |
| 6500 | 194.351145 | 13.870681 | 46.923664 | 6.486178 | 14.725191 | 9.874057 |
| 7150 | 185.679389 | 17.670982 | 51.610687 | 7.017505 | 18.709924 | 13.815297 |
| 7800 | 173.618321 | 23.432038 | 57.335878 | 7.002301 | 25.045802 | 20.131955 |
| 8450 | 167.145038 | 24.663575 | 60.603053 | 7.458465 | 28.251908 | 22.056258 |
| 9100 | 154.854962 | 31.010248 | 63.145038 | 7.898325 | 38.000000 | 30.942942 |
| 9750 | 138.717557 | 34.016447 | 67.755725 | 8.930684 | 49.526718 | 36.745946 |
| 10400 | 123.496183 | 36.5758396 | 8.618321 | 11.301866 | 63.885496 | 43.204227 |
| 11050 | 103.519084 | 41.947323 | 66.503817 | 13.228107 | 85.977099 | 50.994906 |
| 11700 | 86.908397 | 41.562691 | 66.175573 | 16.254879 | 102.916031 | 53.973847 |
| 12350 | 61.305344 | 40.292612 | 54.458015 | 18.468566 | 140.229008 | 55.792495 |
| 13000 | 40.198473 | 36.377667 | 45.641221 | 20.170672 | 170.137405 | 54.468110 |
| 13650 | 31.038168 | 27.994385 | 40.290076 | 20.152279 | 184.625954 | 46.110941 |
| 14300 | 15.618321 | 21.189245 | 27.427481 | 17.614199 | 212.923664 | 37.510837 |
| 14950 | 15.770992 | 18.913449 | 27.450382 | 14.768035 | 212.702290 | 31.900775 |
| 15600 | 9.610687 | 12.745646 | 21.816794 | 15.184766 | 224.526718 | 26.920672 |
| 16250 | 6.954198 | 10.841581 | 18.259542 | 12.528190 | 230.786260 | 22.393772 |
| 16900 | 5.206107 | 8.164078 | 14.488550 | 11.501322 | 236.282443 | 18.906065 |
| 17550 | 3.839695 | 5.262306 | 12.404580 | 8.164136 | 239.725191 | 12.524208 |
| 18200 | 2.862595 | 5.008029 | 10.351145 | 7.386726 | 242.770992 | 11.454233 |
| 18850 | 2.793893 | 4.960481 | 9.793893 | 8.396398 | 243.396947 | 12.454914 |
| 19500 | 1.946565 | 3.571116 | 7.007634 | 6.018415 | 247.038168 | 8.959966 |
| 26000 | 0.221374 | 0.657198 | 1.175573 | 1.361863 | 254.603053 | 1.789193 |

The simulated attempt rate table 176a in TABLE 1 is comprised of a plurality of table entries (rows) individually corresponding to an attempt rate $R_{SIM}$ (the first column in TABLE 1 in units of busy hour call attempts or BHCA) with each entry including simulated values $N_E^{SIM}$, $N_S^{SIM}$, and $N_C^{SIM}$ indicating the mean number of empty, successful, and collision timeslots, respectively, for the corresponding attempt rate $R_{SIM}$ in a simulated rate analysis window having the resource 150 is used as feedback for the apersistence control system 160 (FIG. 3). In particular, attempting to extract current attempt rate based only on success rates ($N_S^{OBS}$) leads to an ambiguity with exception at maximal throughput (maximum $N_S$) in a closed loop control of apersistence in the system 190, as shown in a plot 600 of FIG. 7. The plot 600 illustrates a three dimensional graph of the system attempt data for a given number K timeslots 202 per window 200, where the plotted plane 602 is the solution to the equation $N_S+N_E+N_C=K$.

As shown in FIG. 5, the exemplary observed timeslot data 174 includes values 174a, 174b, and 174c indicating a number $N_E^{OBS}$ of timeslots in the current rate analysis window in which no attempts occurred, a number $N_S^{OBS}$ of timeslots in the current rate analysis window in which a successful attempt occurred, and a number $N_C^{OBS}$ of timeslots in the current rate analysis window in which a collision occurred, respectively. In the illustrated embodiment, moreover, the observed success data 174b further provides values 174b1-174bJ for successful timeslots by device class, where J classes may be supported in the exemplary EVDO system 190 (J being an integer greater than 1). The simulated values $N_E^{SIM}$, $N_S^{SIM}$, and $N_C^{SIM}$ of the entries in the exemplary data table 176a are mean values indicating the mean number of empty, successful, and collision timeslots, respectively, for the corresponding attempt rate $R_{SIM}$, where the table 176a further provides standard deviation values $\sigma_E^{SIM}$, $\sigma_S^{SIM}$, $\sigma_C^{SIM}$ for each entry. Any suitable approach may be used in the logic 172 for selecting the appropriate table entry that most closely matches the observed data 174, such as a software routine or other logical software or hardware that identifies the closest match. In the embodiment of FIG. 5, the rate estimation logic 172 computes a value X for each table entry according to the following first equation 172a (EQUATION 1) as follows:

$$X = \frac{(N_E^{OBS} - N_E^{SIM})^2}{(\sigma_E^{SIM})^2} + \frac{(N_S^{OBS} - N_S^{SIM})^2}{(\sigma_S^{SIM})^2} + \frac{(N_C^{OBS} - N_C^{SIM})^2}{(\sigma_C^{SIM})^2}, \quad (1)$$

The rate estimation logic 172 in this embodiment estimates a current attempt rate $R_{SIM}$ 172d for the entire system 190 as the attempt rate value $R_{SIM}$ corresponding to the table entry having the smallest value of X in the first equation 172a. For single class systems, this value 172d may be used as the attempt rate estimate 178. Alternatively, where detailed success data 174b1-174bJ are available, further processing may be performed in the logic 172 to ascertain relative class based attempt rate values 172e ($R_{1,REL}$, $R_{2,REL}$, ... $R_{J,REL}$ in FIG. 5) based on $R_{SIM}$ 172d using the following second equation 172b (EQUATION 2):

$$R_{i,REL} = \left[\frac{N_S^{OBS,i}}{\sum_{i=1}^{j} N_S^{OBS,i}}\right] R_{SIM}. \quad (2)$$

The illustrated approach thus obtains a least squares type fit for the observed data 178 in the model 176. In the illustrated rate determination system 170, moreover, the logic 172 also scales the relative class attempt rates $R_{i,REL}$ 172e for each class according to a corresponding average throughput scaling factor 164 (ATSF1-ATSFJ) obtained from the apersistence control system 160 associated with the base station resource 150 using the following third equation 172c (EQUATION 3):

$$Ri = ATSFi \times R_{i,REL}, \quad (3)$$

for i=1 through J, where $ATSFi = R_{i,DESIRED}/R_{i,PREVIOUS}$. The resulting scaled class-based attempt rate estimates $178_1$-$178_J$ ($R_1$-$R_J$) are then provided as the estimate 178 to the ACS 160. In this example, the apersistence control system (ACS) 160 selectively controls the apersistence properties of the mobile devices 180, as described further below, using the estimated rate value(s) 178 as feedback to account for the current resource loading, which are properly scaled to account for the apersistence used.

FIG. 6 illustrates an exemplary method 110 that may be carried out in the AADRS 170 or other suitable system in accordance with the invention. As with the above method 10 in FIG. 1, method 110 includes obtaining current rate analysis window timeslot data from the base station resource at 120 (e.g., data 174 above). In the illustrated embodiment, the observed data includes the values 174a-174J, and the method 110 further includes estimating a current attempt rate (e.g., rate 178) based on a simulated attempt rate model and the current rate analysis window timeslot data at 132-138. At 132 and 134, a closest table entry is selected for which the current rate analysis window timeslot data most closely corresponds to the simulated values in the model by minimizing the above EQUATION 1 at 132 using the current window timeslot data 174 and the table entry parameters, with the rate value $R_{SIM}$ being obtained at 134 from the selected table entry. The attempt rate can be estimated as the value $R_{SIM}$ itself, or other techniques can be used wherein the rate is estimated based on the attempt rate value $R_{SIM}$ corresponding to the selected table entry. The illustrated method 110 also contemplates multiple priority systems 190, wherein relative rates are calculated at 136 for the respective priority classes using the above EQUATION 2, and the relative rates may optionally be scaled at 138 according to current ATSF values to yield the estimated current attempt rates $R_1$-$R_J$. At 140, the window is updated with data from one or more new timeslots, whereafter another estimate is generated at 132-138, and the method 110 may thereafter be repeated as described above. In one example where the estimate 178 is used purely for monitoring or data gathering purposes, the window 200 is updated by the addition of a single newly measured timeslot 202 at 140 (and the corresponding removal of the oldest timeslot 202 from the window 200), wherein the values 174a-174c of the window timeslot data 174 are recomputed for use in the next rate estimation. Where the estimate 178 is used in a closed loop system as feedback and the estimated attempt rate changes from the previous rate estimate, it may be preferred to wait until the system flushes out all effects of previous apersistence and then obtain an entirely new window's worth of data at 140 prior to proceeding to generate the next estimate 178. Moreover, as discussed further below with respect to FIG. 8, the method 110 of FIG. 6 may be employed in association with two or more models, such as a short data table and a longer data table, to generate first and second current attempt rate estimates using the data tables and first and second sets of window data for two different window lengths.

Figure 8:
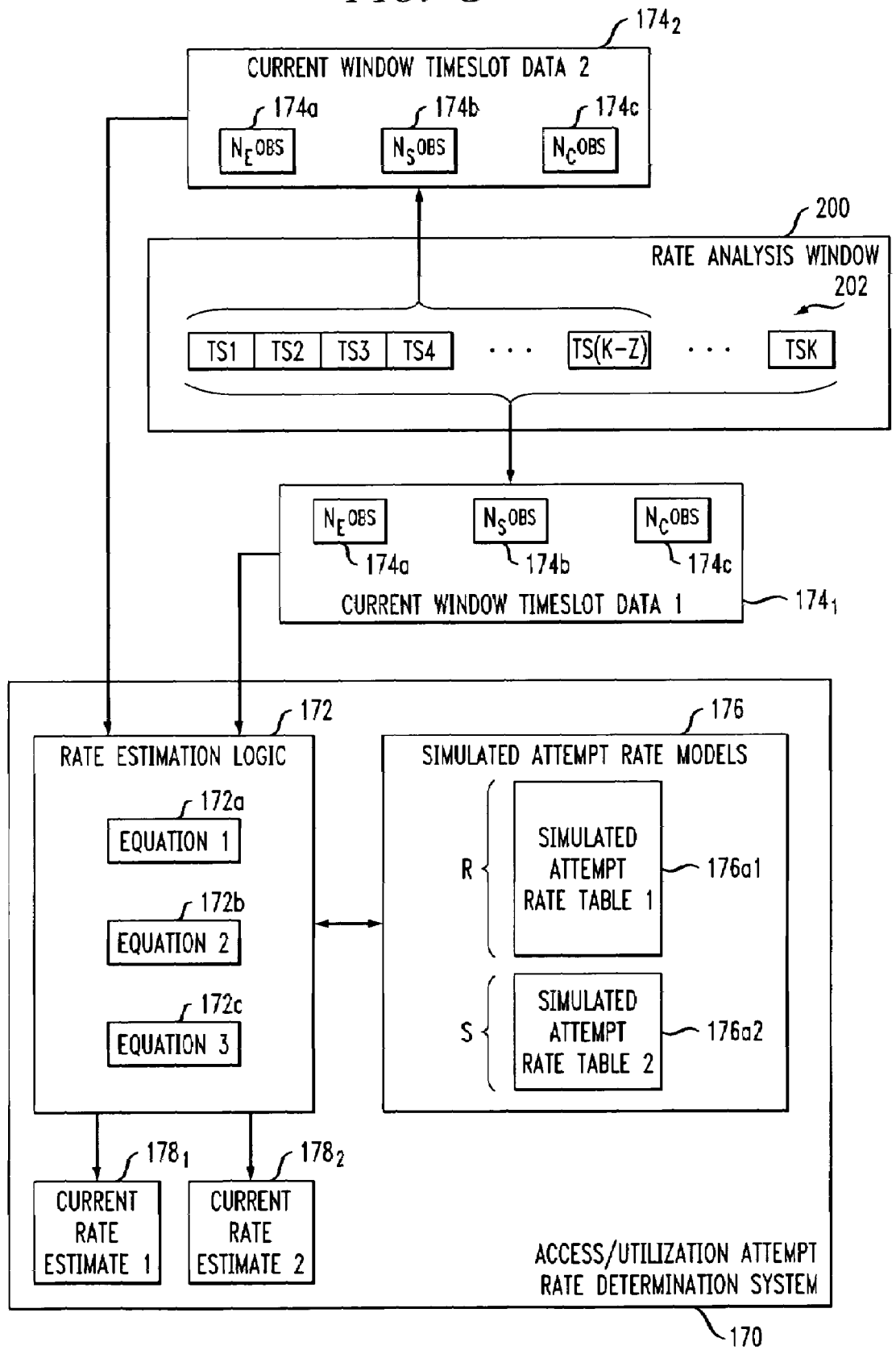
FIG. 8 is a schematic diagram illustrating another implementation of the system of FIG. 5, in which the attempt rate determination system includes multiple simulated rate tables based on different window lengths operating on different current window time slot data sets to generate multiple current attempt rate estimates.

FIG. 8 shows another possible implementation of an access/utilization attempt rate determination system 170 in accordance with the invention, wherein the simulated attempt rate model 176 includes first and second simulated attempt rate data tables 176a1 and 176a2, where the first table 176a1 has an integer number R table entries (e.g., 31 entries as in the above TABLE 1), and the second table 176a2 has a smaller number S entries. Moreover, the tables 176a are based on different window sizes, where the first table 176a1 is simulated according to a first window size K (e.g., 256 timeslots per window as in TABLE 1 above), whereas the smaller table 176a2 is simulated according to a smaller window size (K-Z, where Z is an integer greater than zero), such as 56 timeslots per window in one example (e.g., Z=200, with the second window corresponding to approximately 5.97 seconds). Each table 176a may be simulated using the above described or equivalent techniques, with the differences being the corresponding window sizes K from (K-Z) and $R_{SIM}$ granularity between adjacent table entries, where the number of entries R and S may, but need not, be different (e.g., R>S in one example), with the granularity of the smaller second table 176a2 being greater than the granularity of the first table 176a1. As with the example of TABLE 1 above, the tables 176a1 and 176a2 each include table entries individually corresponding to an attempt rate $R_{SIM}$ with simulated values $N_E^{SIM}$, $N_S^{SIM}$, and $N_C^{SIM}$ indicating the number of empty, successful, and collision timeslots, respectively, (as well as associated standard deviation values) for the corresponding attempt rate $R_{SIM}$ in the associated simulated rate analysis windows (K and (K-Z) timeslots, respectively). The rate estimation logic 172 obtains first and second sets of current rate analysis window timeslot data $174_1$ and $174_2$ corresponding to K and (K-Z) successive timeslots 202, respectively. As described above, the window data sets $174_1$ and indicate the number of empty, successful, and collision timeslots 202 within the corresponding current window, wherein the timeslot TS1 is the most recent timeslot in the example shown in FIG. 8. In this case, a single set of K values may be obtained, with the corresponding timeslot data values $174_1$ being computed based on all K timeslots 202, whereas the second values $174_2$ are determined based on the most recent K-Z timeslots 202. The rate estimation logic 172 in the AARDS 170 estimates a first current attempt rate $178_1$ based on a first attempt rate value $R_{SIM}$ corresponding to the entry of the first table 176a1 for which the first window data $174_1$ most closely corresponds to the simulated values of the first data table 176a1, using the techniques described above. In similar fashion, the logic 172 estimates the second current attempt rate $178_2$ based on a second attempt rate value $R_{SIM}$ of the entry of the second table 176a2 for which the second window data $174_2$ most closely corresponds to the simulated values of the second data table 176a2.

The different estimates $178_1$ and $178_2$ may be used in any desirable fashion, such as for throughput monitoring and/or control purposes. For example, in situations where apersistence is used to control a communications system 190 with apersistence values being determined in closed loop fashion based at least in part on the estimated rate(s) 178 from the AARDS 170, the window(s) 200 can be updated in a sliding window fashion with a current timeslot value being added to the window 200 as the oldest timeslot 202 is removed from the window 200, with the data $174_1$ and $174_2$ being recompiled (new summations for observed empty, successful, and collision slots 202) as each new timeslot becomes available under static loading conditions. In this manner, the two differently sized rate windows 200 can be evaluated simultaneously, with the estimate $178_2$ based on the smaller window table 176a2 being used for fast transient response with respect to large access attempt rate changes, wherein the apersistence control system 160 can react quickly to a large increase in incoming traffic, while the larger table 176a1 and the first estimate $178_1$ provide a better (statistically more significant) estimate of access attempts in a more stable system 190. In one possible implementation, the system 170 can detect a rate change, such as above a certain threshold relative to the prior estimate 178, and thereafter the ACS 160 can take appropriate action, while the AARDS 170 uses the most recent estimate $178_1$ while waiting for the window 200 to empty of data affected by the previous apersistence value(s). In another implementation, when either of the estimates 178 indicates an attempt rate change, the ACS 160 modifies the apersistence values, with the window(s) 200 again being allowed to refill before generating new estimates 178. In an open loop system, the windows 200 can continue to acquire new timeslots 202 one by one in a sliding window fashion. In another preferred implementation providing two estimates 178 using the first and second tables 176a and the two sets of widow data 174, the best estimate 178 can be selected according to which of the estimates 178 indicate a change since the previous estimate. In one embodiment, the second estimate $178_2$ (based on the smaller window) is used for the best guess in situations where only one of the estimates 178 indicates a rate change (typically, the second estimate $178_2$ will indicate the change). Where both estimates 178 indicate a rate change, the first estimate $178_1$ is used as the best guess, since the finer granularity in the larger table 176a1 provides better statistical estimation accuracy.

Figure 9:
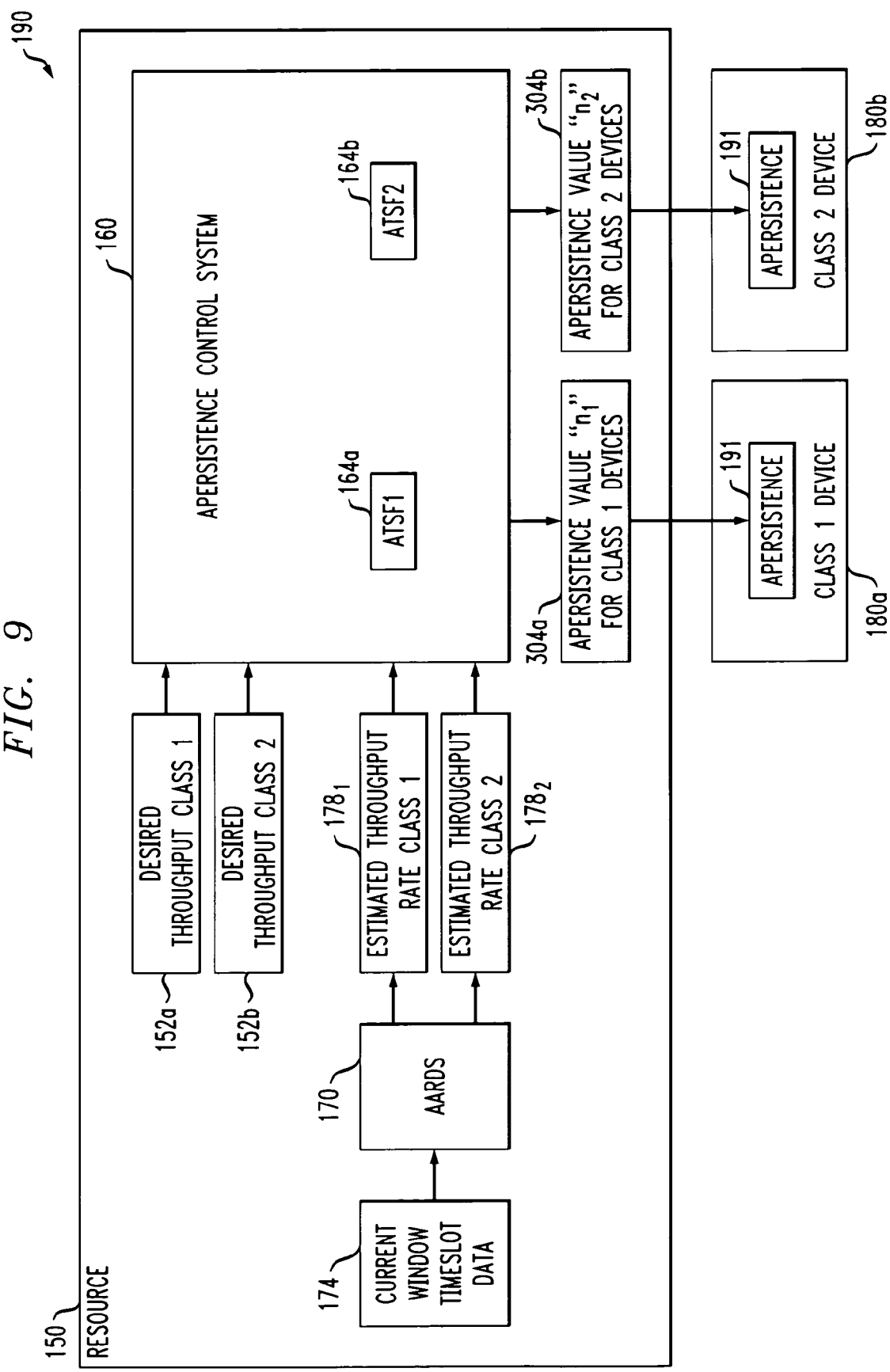
FIG. 9 is a schematic diagram illustrating an apersistence control system associated with the base station resource, receiving estimated throughput or access/utilization attempt rates from the access/utilization attempt rate determination system of FIGS. 3 and 5.
Figure 10:
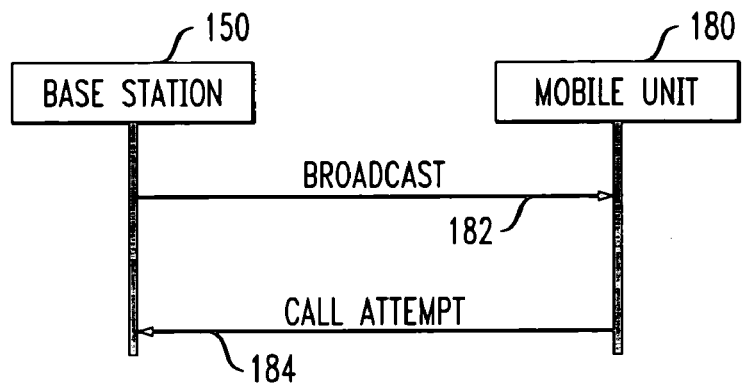
FIG. 10 is a simplified call flow diagram illustrating a broadcast message from the base station resource to the mobile unit communications devices in FIG. 3 that includes an apersistence property determined according to the estimated attempt rate from the rate determination system of FIGS. 3 and 5, as well as a call initiation attempt message from a mobile device to the base station resource for attempting utilization after passing an apersistence test.
Figure 11:
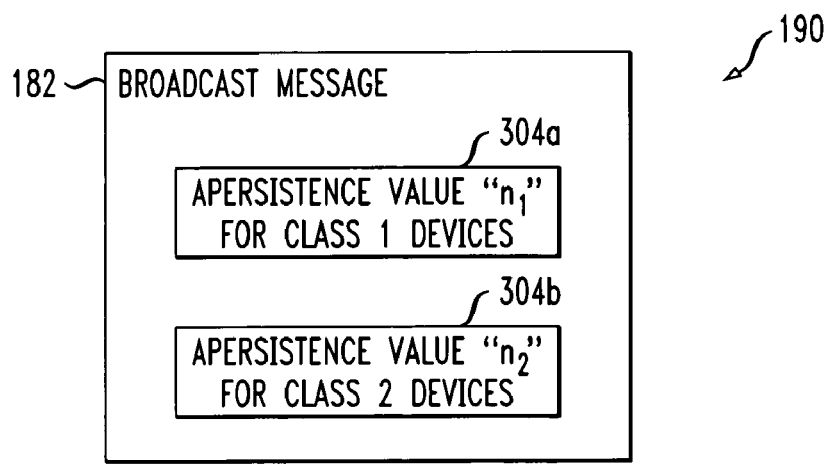
FIG. 11 is a simplified schematic diagram illustrating an exemplary broadcast message including apersistence property values for first and second priority classes in the system of FIG. 10.
Figure 12:
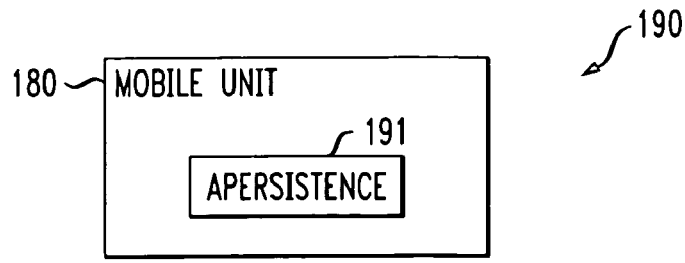
FIG. 12 is a simplified schematic diagram illustrating an exemplary mobile communications device or unit, such as an EVDO compatible cell phone, with apersistence logic for performing an apersistence test using an apersistence property value from the broadcast message of FIG. 11.
Figure 13:
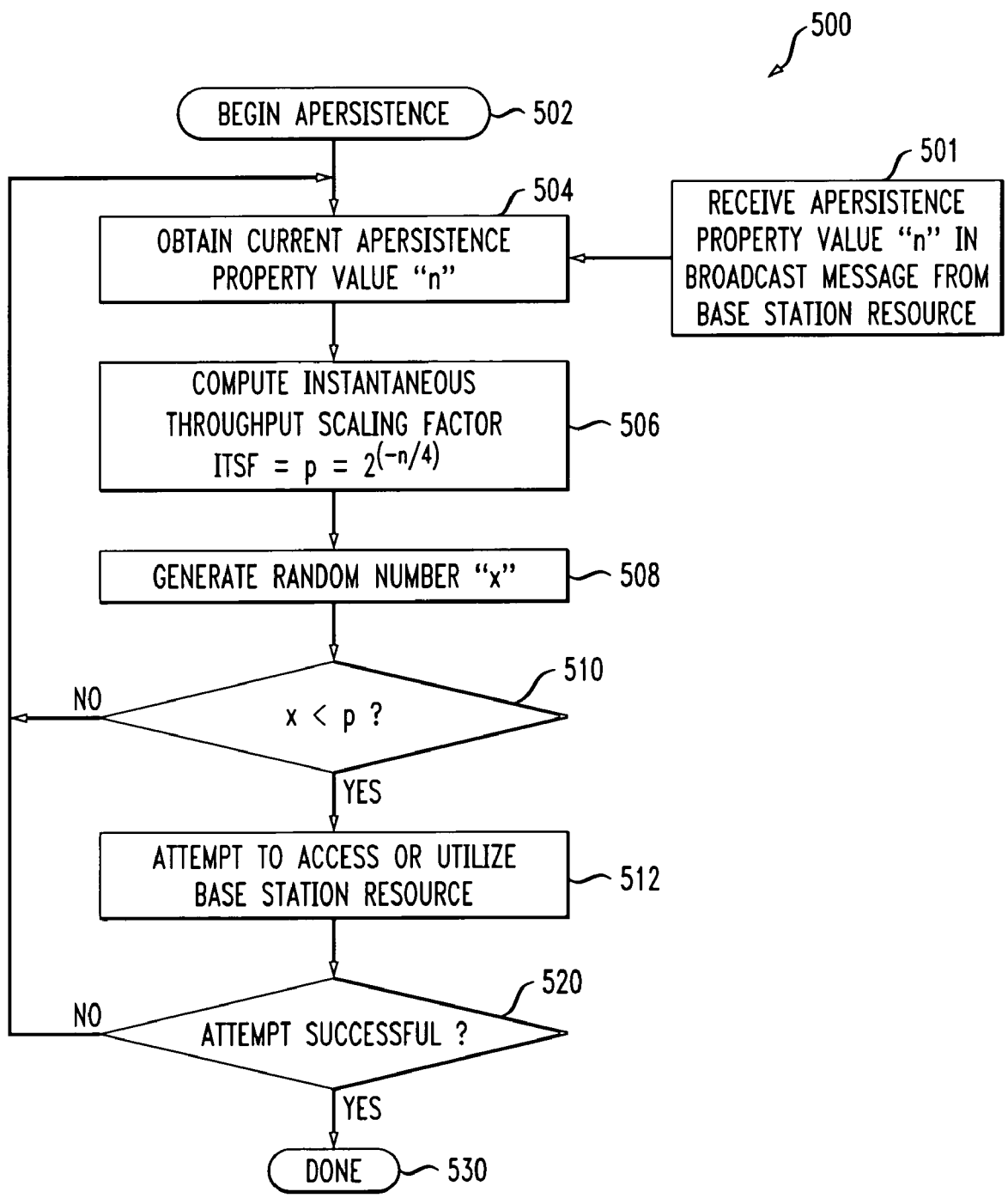
FIG. 13 is a flow diagram illustrating an exemplary apersistence test in the mobile communications device of FIG. 12.

Referring also to FIGS. 9-13, the rate estimation systems and methods of the invention may particularly useful in providing estimates 178 in communications systems, such as wireless EVDO type systems 190, where the estimated rate or rates 178 are used in an apersistence control scheme to control system response times and throughput for multiple classes of mobile devices 180. FIG. 9 illustrates the exemplary EVDO Rev. A communications system base station resource 150 servicing a number of mobile communications devices 180, wherein some devices 180a are of a first priority class (e.g., high priority) and others 180b are of a second class (low priority). The resource 150 includes apersistence control system (ACS) 160 operable to generate apersistence values 304a and 304b and provide these to the devices 180a and 180b, respectively. Like the AARDS 170, the ACS 160 may be integrated into the resource 150 as shown, or may instead be implemented in another device, such as a switching element or other network element operatively coupled with the resource 150 to provide the functionality set forth herein (e.g., a network server 192 operatively associated with the base station resource 150, as shown in FIG. 3 above). ACS 160 receives desired throughput values 152a and 152b, along with the estimated class throughput rates $178_1$ and $178_2$, for the two classes, and generates first and second utilization scaling factors (e g., average throughput scaling factors ATSF1 and ATSF2) 164a and 164b corresponding to the first and second classes, respectively. In the illustrated example, the individual scaling factors 164 are computed as the desired throughputs 152 divided by the estimated attempt (throughput) rates 178 for the corresponding class. The class scaling factors 164 are then used in generating apersistence values 304a and 304b for the first and second class devices 180a and 180b, respectively.

The resource 150 then provides the apersistence property values 304 to the devices 180, for instance, in broadcast messages 182 (FIGS. 10 and 11) sent at update cycle periods for use by apersistence logic systems 191 in performing apersistence tests in the devices 180 for selectively attempting to initiate calls using the base station resource 150. In the EVDO Rev. A system 190, the base station 150 periodically sends broadcast messages 182 (FIGS. 10 and 11) to the devices 180 (e.g., at least once during each apersistence update cycle), including apersistence values 304a and 304b corresponding to the first and second (e.g., high and low) priority classes, wherein up to four different classes can be supported in accordance with the EVDO standards, although any number J classes can be used in an implementation of the present invention, with two classes being described herein for the sake of illustration only. The devices 180 then perform apersistence tests internally to decide whether and when to initiate call attempts 184.

The apersistence property values "n1" and "n2" correspond to the first and second classes, respectively, where each "n" value is an integer in a range of 0 to 63 inclusive, although other value formats can be used. Each device 180 includes apersistence logic or firmware 191 (FIG. 12) to implement an apersistence test 500 (FIG. 13) using the appropriate "n" value for a given device priority class. The test begins at 502 with an apersistence property value "n" being received at 501 as the apersistence updates are provided in the form of a broadcast message 182 from the base station resource 150, where the apersistence test 500 operates essentially asynchronously from the update. The device 180 obtains the most recently received apersistence property value ("n" value) 304 at 504 sent in a base station broadcast message 182 and computes an instantaneous throughput scaling factor (ITSF)= $p=2^{-n/4}$ at 506. A random number "x" is generated at 508 (e.g., in a range of 0 to 1 inclusive) and the "x" value is compared to the ITSF (p) at 510 to determine if the device 180 should attempt to access or utilize the base station 150 (e.g., whether to initiate a call attempt 184 in the current access cycle or not). If the test fails (e.g., NO at 510 for x greater than or equal to p), the method 500 returns to 504 and another test is performed in the subsequent access cycle. Otherwise (YES at 510), an access/utilization attempt is made at 512, and if successful (YES at 520), the apersistence test 500 ends at 530. If unsuccessful (NO at 520), the method 500 returns to run another apersistence test at 504 as described above.

Although the invention has been illustrated and described with respect to one or more exemplary implementations or embodiments, equivalent alterations and modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary implementations of the invention. In addition, although a particular feature of the invention may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

The following is claimed:

1. A method for estimating a rate of attempted access or utilization of a resource or pool of resources by a plurality of devices, the method comprising:

obtaining current rate analysis window timeslot data corresponding to an integer number K successive timeslots forming a current rate analysis window, K being an integer greater than 1, the timeslot data indicating a number $N_E^{OBS}$ of timeslots in the current rate analysis window in which no attempts occurred, a number $N_S^{OBS}$ of timeslots in the current rate analysis window in which a successful attempt occurred, and a number $N_C^{OBS}$ of timeslots in the current rate analysis window in which a collision occurred; and estimating a current attempt rate based on a simulated attempt rate model and the current rate analysis window timeslot data.

2. The method of claim 1, wherein the simulated attempt rate model comprises a data table having a plurality of table entries individually corresponding to an attempt rate $R_{SIM}$, with each table entry including simulated values $N_E^{SIM}$, $N_S^{SIM}$, and $N_C^{SIM}$ indicating the number of empty, successful, and collision timeslots, respectively, for the corresponding attempt rate $R_{SIM}$ in a simulated rate analysis window having K timeslots, and wherein estimating the current attempt rate comprises:

selecting a table entry for which the current rate analysis window timeslot data most closely corresponds to the simulated values $N_E^{SIM}$, $N_S^{SIM}$, and $N_C^{SIM}$; and estimating the current attempt rate based on the attempt rate value $R_{SIM}$ corresponding to the selected table entry.

3. The method of claim 2, wherein the simulated values $N_E^{SIM}$, $N_S^{SIM}$, and $N_C^{SIM}$ of the data table are mean values indicating the mean number of empty, successful, and collision timeslots, respectively, for the corresponding attempt rate, wherein the data table entries further include simulated standard deviation values $\sigma_E^{SIM}$, $\sigma_S^{SIM}$, $\sigma_C^{SIM}$ indicating simulated standard deviations for the number of empty, successful, and collision timeslots, respectively, for the corresponding attempt rate, and wherein selecting a table entry for which the current rate analysis window timeslot data most closely corresponds to the simulated values $N_E^{SIM}$, $N_S^{SIM}$, and $N_C^{SIM}$ comprises:

computing a value X for each table entry according to the following equation:

$$X = \frac{(N_E^{OBS} - N_E^{SIM})^2}{(\sigma_E^{SIM})^2} + \frac{(N_S^{OBS} - N_S^{SIM})^2}{(\sigma_S^{SIM})^2} + \frac{(N_C^{OBS} - N_C^{SIM})^2}{(\sigma_C^{SIM})^2};$$

selecting the table entry corresponding to the smallest value of X.

4. The method of claim 3, wherein devices of an integer number J different priority classes are able to utilize the resource or pool of resources, J being an integer greater than 1, wherein the window timeslot data further indicates numbers $N_S^{OBS,i}$ of successful attempts for the corresponding priority classes for i=1 through J in the current rate analysis window, and wherein estimating the current attempt rate further comprises determining an estimated relative class attempt rate $R_{i,REL}$ for each class according to the following equation:

$$R_{i,REL} = \left[ \frac{N_S^{OBS,i}}{\sum_{i=1}^{J} N_S^{OBS,i}} \right] R_{SIM}.$$

5. The method of claim 4, wherein estimating the current attempt rate further comprises scaling the relative class attempt rates $R_{i,REL}$ for each class according to a current average throughput scaling factor.

6. The method of claim 2, wherein devices of an integer number J different priority classes are able to utilize the resource or pool of resources, J being an integer greater than 1, wherein the window timeslot data further indicates numbers $N_S^{OBS,i}$ of successful attempts for the corresponding priority classes for i=1 through J in the current rate analysis window, and wherein estimating the current attempt rate further comprises determining an estimated relative class attempt rate $R_{i,REL}$ for each class according to the following equation:

$$R_{i,REL} = \left[ \frac{N_S^{OBS,i}}{\sum_{i=1}^{J} N_S^{OBS,i}} \right] R_{SIM}.$$

7. The method of claim 2, wherein the simulated model comprises first and second data tables, the first data table having an integer number R table entries individually corresponding to an attempt rate $R_{SIM}$ and including simulated values $N_E^{SIM}$, $N_S^{SIM}$, and $N_C^{SIM}$ indicating the number of empty, successful, and collision timeslots, respectively, for the corresponding attempt rate $R_{SIM}$ in a first simulated rate analysis window having K timeslots, wherein the second data table has an integer number S table entries individually corresponding to an attempt rate $R_{SIM}$ and including simulated values $N_E^{SIM}$, $N_S^{SIM}$, and $N_C^{SIM}$ indicating the number of empty, successful, and collision timeslots, respectively, for the corresponding attempt rate $R_{SIM}$ in a second simulated rate analysis window having K-Z timeslots, Z being an integer greater than or equal to 1, further comprising:
 obtaining first current rate analysis window timeslot data corresponding to K successive timeslots forming a first current rate analysis window, the first timeslot data indicating a number $N_E^{OBS}$ of timeslots in the first current rate analysis window in which no attempts occurred, a number $N_S^{OBS}$ of timeslots in the first current rate analysis window in which a successful attempt occurred, and a number $N_C^{OBS}$ of timeslots in the first current rate analysis window in which a collision occurred; and
 obtaining second current rate analysis window timeslot data corresponding to K-Z successive timeslots forming a second current rate analysis window, the second timeslot data indicating a number $N_E^{OBS}$ of timeslots in the second current rate analysis window in which no attempts occurred, a number $N_S^{OBS}$ of timeslots in the second current rate analysis window in which a successful attempt occurred, and a number $N_C^{OBS}$ of timeslots in the second current rate analysis window in which a collision occurred;
 wherein estimating the current attempt rate comprises:
  selecting a first table entry for which the first current rate analysis window timeslot data most closely corresponds to the simulated values $N_E^{SIM}$, $N_S^{SIM}$, and $N_C^{SIM}$ of the first data table;
  estimating a first current attempt rate based on the first attempt rate value $R_{SIM}$ corresponding to the selected table entry of the first data table;
  selecting a second table entry for which the second current rate analysis window timeslot data most closely corresponds to the simulated values $N_E^{SIM}$, $N_S^{SIM}$, and $N_C^{SIM}$ of the second data table; and
  estimating a second current attempt rate based on the second attempt rate value $R_{SIM}$ corresponding to the selected table entry of the second data table.

8. The method of claim 7, wherein R is greater than S, and wherein the granularity between adjacent rate values $R_{SIM}$ in the second table are larger compared to granularity between adjacent rate values $R_{SIM}$ in the first table.

9. The method of claim 1, wherein devices of an integer number J different priority classes are able to utilize the resource or pool of resources, J being an integer greater than 1, wherein the window timeslot data further indicates numbers $N_S^{OBS,i}$ of successful attempts for the corresponding priority classes for i=1 through J in the current rate analysis window, and wherein estimating the current attempt rate further comprises determining an estimated relative class attempt rate $R_{i,REL}$ for each class based on the simulated attempt rate model and the current rate analysis window timeslot data.

10. The method of claim 1, further comprising updating the rate analysis window with data from one or more new timeslots and estimating a new current attempt rate based on the simulated attempt rate model and the updated rate analysis window timeslot data.

11. An access/utilization attempt rate determination system for estimating a rate of attempted access or utilization of a resource or pool of resources by a plurality of devices, the rate determination system comprising:
 a simulated attempt rate model that maps simulations of attempt rates to observed data in an integer number of K successive timeslots forming a rate analysis window, K being an integer greater than 1; and
 rate estimation logic operatively associated with the simulated rate model and the resource or pool of resources, the rate estimation logic obtaining current rate analysis window timeslot data, corresponding to a current rate analysis window and estimating a current attempt rate based on the simulated attempt rate model and the current rate analysis window timeslot data.

12. The attempt rate determination system of claim 11, wherein the timeslot data indicates a number $N_E^{OBS}$ of timeslots in the current rate analysis window in which no attempts occurred, a number $N_S^{OBS}$ of timeslots in the current rate analysis window in which a successful attempt occurred, and a number $N_C^{OBS}$ of timeslots in the current rate analysis window in which a collision occurred.

13. The attempt rate determination system of claim 11, wherein the simulated attempt rate model comprises a data table having a plurality of table entries individually corresponding to an attempt rate $R_{SIM}$, with each table entry including simulated values $N_E^{SIM}$, $N_S^{SIM}$, and $N_C^{SIM}$ indicating the number of empty, successful, and collision timeslots, respectively, for the corresponding attempt rate $R_{SIM}$ in a simulated rate analysis window having K timeslots, and wherein the rate estimation logic estimates the current attempt rate based on the attempt rate value $R_{SIM}$ corresponding to the table entry for which the current rate analysis window timeslot data most closely corresponds to the simulated values $N_E^{SIM}$, $N_S^{SIM}$, and $N_C^{SIM}$.

14. The attempt rate determination system of claim 13, wherein the timeslot data indicates a number $N_E^{OBS}$ of timeslots in the current rate analysis window in which no attempts occurred, a number $N_S^{OBS}$ of timeslots in the current rate analysis window in which a successful attempt occurred, and a number $N_C^{OBS}$ of timeslots in the current rate analysis window in which a collision occurred, wherein the simulated values $N_E^{SIM}$, $N_S^{SIM}$, and $N_C^{SIM}$ of the data table are mean values indicating the mean number of empty, successful, and collision timeslots, respectively, for the corresponding attempt rate, wherein the data table entries further include simulated standard deviation values $\sigma_E^{SIM}$, $\sigma_S^{SIM}$, $\sigma_C^{SIM}$ indicating simulated standard deviations for the number of empty, successful, and collision timeslots, respectively, for the corresponding attempt rate, wherein the rate estimation logic computes a value X for each table entry according to the following equation:

$$X = \frac{(N_E^{OBS} - N_E^{SIM})^2}{(\sigma_E^{SIM})^2} + \frac{(N_S^{OBS} - N_S^{SIM})^2}{(\sigma_S^{SIM})^2} + \frac{(N_C^{OBS} - N_C^{SIM})^2}{(\sigma_C^{SIM})^2},$$

and wherein the rate estimation logic estimates the current attempt rate as the attempt rate value $R_{SIM}$ corresponding to the table entry having the smallest value of X.

15. The attempt rate determination system of claim 14, wherein devices of an integer number J different priority classes are able to attempt access or utilization of the resource or pool of resources, J being an integer greater than 1, wherein the window timeslot data further indicates numbers $N_S^{OBS,i}$ of successful attempts for the corresponding priority classes for i=1 through J in the current rate analysis window, and wherein the rate estimation logic determines an estimated relative class attempt rate $R_{i,REL}$ for each class according to the following equation:

$$R_{i,REL} = \left[ \frac{N_S^{OBS,i}}{\sum_{i=1}^{J} N_S^{OBS,i}} \right] R_{SIM}.$$

16. The attempt rate determination system of claim 15, wherein the rate estimation logic scales the relative class attempt rates $R_{i,REL}$ for each class according to a current average throughput scaling factor.

17. The attempt rate determination system of claim 15, wherein the rate estimation logic updates the rate analysis window with data from one or more new timeslots and estimates a new current attempt rate based on the simulated attempt rate model and the updated rate analysis window timeslot data.

18. The attempt rate determination system of claim 13, wherein devices of an integer number J different priority classes are able to attempt access or utilization of the resource or pool of resources, J being an integer greater than 1, wherein the window timeslot data further indicates numbers $N_S^{OBS,i}$ of successful attempts for the corresponding priority classes for i=1 through J in the current rate analysis window, and wherein the rate estimation logic determines an estimated relative class attempt rate $R_{i,REL}$ for each according to the following equation:

$$R_{i,REL} = \left[ \frac{N_S^{OBS,i}}{\sum_{i=1}^{J} N_S^{OBS,i}} \right] R_{SIM}.$$

19. The attempt rate determination system of claim 13, wherein the timeslot data indicates a number $N_E^{OBS}$ of timeslots in the current rate analysis window in which no attempts occurred, a number $N_S^{OBS}$ of timeslots in the current rate analysis window in which a successful attempt occurred, and a number $N_C^{OBS}$ of timeslots in the current rate analysis window in which a collision occurred.

20. The attempt rate determination system of claim 13, wherein the simulated attempt rate model comprises:

a first data table comprising an integer number R table entries individually corresponding to an attempt rate $R_{SIM}$ and including simulated values $N_E^{SIM}$, $N_S^{SIM}$, and $N_C^{SIM}$ indicating the number of empty, successful, and collision timeslots, respectively, for the corresponding attempt rate $R_{SIM}$ in a first simulated rate analysis window having K timeslots; and a second data table comprising an integer number S table entries individually corresponding to an attempt rate $R_{SIM}$ and including simulated values $N_E^{SIM}$, $N_S^{SIM}$, and $N_C^{SIM}$ indicating the number of empty, successful, and collision timeslots, respectively, for the corresponding attempt rate $R_{SIM}$ in a second simulated rate analysis window having K-Z timeslots, Z being an integer greater than or equal to 1;

wherein the rate estimation logic obtains first current rate analysis window timeslot data corresponding to K successive timeslots forming a first current rate analysis window, the first timeslot data indicating a number $N_E^{OBS}$ of timeslots in the first current rate analysis window in which no attempts occurred, a number $N_S^{OBS}$ of timeslots in the first current rate analysis window in which a successful attempt occurred, and a number $N_C^{OBS}$ of timeslots in the first current rate analysis window in which a collision occurred;

wherein the rate estimation logic obtains second current rate analysis window timeslot data corresponding to K successive timeslots forming a second current rate analysis window, the second timeslot data indicating a number $N_E^{OBS}$ of timeslots in the second current rate analysis window in which no attempts occurred, a number $N_S^{OBS}$ of timeslots in the second current rate analysis window in which a successful attempt occurred, and a number $N_C^{OBS}$ of timeslots in the second current rate analysis window in which a collision occurred;

wherein the rate estimation logic estimates a first current attempt rate based on a first attempt rate value $R_{SIM}$ corresponding to the table entry of the first data table for which the first current rate analysis window timeslot data most closely corresponds to the simulated values $N_E^{SIM}$, $N_S^{SIM}$, and $N_C^{SIM}$ of the first data table; and wherein the rate estimation logic estimates a second current attempt rate based on a second attempt rate value $R_{SIM}$ corresponding to the table entry of the second data table for which the second current rate analysis window timeslot data most closely corresponds to the simulated values $N_E^{SIM}$, $N_S^{SIM}$, and $N_C^{SIM}$ of the second data table.

21. The attempt rate determination system of claim 20, wherein R is greater than S, and wherein the granularity between adjacent rate values $R_{SIM}$ in the second table are larger compared to granularity between adjacent rate values $R_{SIM}$ in the first table.

22. The attempt rate determination system of claim 13, wherein devices of an integer number J different priority classes are able to utilize the resource or pool of resources, J being an integer greater than 1, wherein the window timeslot data further indicates numbers $N_S^{OBS,i}$ of successful attempts for the corresponding priority classes for i=1 through J in the current rate analysis window, and wherein the rate estimation logic determines an estimated relative class attempt rate $R_{i,REL}$ for each class based on the simulated attempt rate model and the current rate analysis window timeslot data.

23. The attempt rate determination system of claim 11, wherein the rate estimation logic updates the rate analysis window with data from one or more new timeslots and estimates a new current attempt rate based on the simulated attempt rate model and the updated rate analysis window timeslot data.

24. The attempt rate determination system of claim 11, wherein the rate estimation logic and the simulated attempt rate model are integrated in a base station resource of a wireless communications system.

25. A system for estimating a rate of attempted access or utilization of a resource or pool of resources by a plurality of devices, comprising:
   simulation means for mapping simulations of attempt rates to observed data in an integer number of K successive timeslots forming a rate analysis window, K being an integer greater than 1; and
   estimation means for estimating a current attempt rate based on the simulation means and current rate analysis window timeslot data obtained from the resource or pool of resources.

* * * * *

UNITED STATES PATENT AND TRADEMARK OFFICE
CERTIFICATE OF CORRECTION

PATENT NO. : 7,626,997 B2 Page 1 of 1
APPLICATION NO. : 11/257337
DATED : December 1, 2009
INVENTOR(S) : Cary Y. Yoshikawa It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1073 days.

Signed and Sealed this

Twenty-first Day of December, 2010

David J. Kappos
*Director of the United States Patent and Trademark Office*